(12) United States Patent
Flannery et al.

(10) Patent No.: US 8,120,935 B2
(45) Date of Patent: Feb. 21, 2012

(54) POWER CONVERTER WITH DUAL RING NETWORK CONTROL

(75) Inventors: Patrick S. Flannery, Madison, WI (US);
David G. Oteman, Delafield, WI (US);
Matthew W. Tilstra, Rogers, MN (US);
Gary Steven Parnes, Plymouth, MN (US)

(73) Assignee: American Superconductor Corporation, Devens, MA (US)

( * ) Notice: Subject to any disclaimer, the term of this patent is extended or adjusted under 35 U.S.C. 154(b) by 0 days.

(21) Appl. No.: 13/074,225

(22) Filed: Mar. 29, 2011

(65) Prior Publication Data

US 2011/0267854 A1 Nov. 3, 2011

(51) Int. Cl.
*H02J 1/00* (2006.01)
(52) U.S. Cl. ........................................................ 363/72
(58) Field of Classification Search .................. 363/65, 363/71, 72; 307/82
See application file for complete search history.

(56) References Cited

U.S. PATENT DOCUMENTS

| | | | |
|---|---|---|---|
| 6,169,679 B1 * | 1/2001 | Deng et al. | 363/72 |
| 6,788,559 B2 * | 9/2004 | Sheng et al. | 363/72 |
| 7,593,243 B2 * | 9/2009 | Ganev et al. | 363/44 |

OTHER PUBLICATIONS

Laakkonen, T., et al. "Time-Stamping-based synchronization of power electronics building block systems" *Industrial Electronics, 2009. IECON '09. 35th Annual Conference of IEEE.* DOI: 10.1109/IECON.2009.5415042 (2009) pp. 925-930.

Francis, G., et al. "A power electronics communication protocol for distributed digital control architectures" *IEEE Power and Energy Society General Meeting—Conversion and Delivery of Electrical Energy in the 21st Century, 2008* Digital Object Identifier: 10.1109/PES.2008.4596827; (2008) pp. 1 - 8.
Felser, M. "Real-Time Ethernet—Industry Prospective" *Proceedings of the IEEE*, vol. 93, issue 6. DOI 10.1109/JPROC.2005.849720 (2005) pp. 1111-1129.
Decotignie, J-D. "Ethernet-Based Real-Time and Industrial Communications" *Proceedings of the IEEE*, vol. 93 issue 6. DOI: 10.1109/JPROC.2005.849721 (2005) pp. 1102-1117.
Lijun Hang, et al. "High Speed and Intelligent Communication Topology Dedicated to Complex Power Electronic System Integration" *IEEE International Symposium on Industrial Electronics*, 2007. DOI: 10.1109/ISIE.2007.4374645 (2007) pp. 485-490.
Yao Zhang, et al. "Study on Networked Control for Power Electronic Systems" *IEEE Power Electronics Specialists Conference*, 2007. DOI: 10.1109/PESC.2007.4342096 (2007) pp. 833-838.

(Continued)

*Primary Examiner* — Matthew Nguyen
(74) *Attorney, Agent, or Firm* — Occhiuti Rohlicek & Tsao LLP

(57) ABSTRACT

A method for providing electric power to a power system includes receiving, at a slave node of a power converter having a plurality of slave nodes, a first synchronization signal via a first communication channel, the first synchronization signal purporting to represent a master timing characteristic of a master control node of the converter; receiving, at the slave node of the converter, a second synchronization signal via a second communication channel, the second synchronization signal purporting to represent a master timing characteristic of the master control node of the converter; synchronizing an internal timing characteristic of the slave control node with the master timing characteristic of the master control node using the first synchronization signal; determining that the first synchronization signal is invalid; and synchronizing an internal timing characteristic of the slave control node with the master timing characteristic of the master control node using the second synchronization signal.

20 Claims, 12 Drawing Sheets

OTHER PUBLICATIONS

Yao Zhang, et al. "Design Issues of Building Block Structure Communications for Power Electronic System" *37th IEEE Power Electronics Specialists Conference*, 2006. DOI: 10.1109/PESC.2006.1712222 (2006) pp. 1-7.

Bassi, E., et al. "Communication protocols for electrical drives" *Proceedings of the 1995 IEEE IECON 21st International Conference on Industrial Electronics, Control, and Instrumentation*, 1995, vol. I. DOI: 10.1109/IECON. 1995.783494 (1995) pp. 706-711.

Milosavljevic, I. et al. "Analysis of converter operation with phase-leg control in daisy-chained or ring-type structure" *30th Annual IEEE Power Electronics Specialists Conference*, 1999. PESC 99. vol. 2. DOI: 10.1109/PESC.1999.785667 (1999) pp. 1216-1221 vol. 2.

Celanovic, I. "A new distributed digital controller for the next generation of power electronics building blocks" *Fifteenth Annual IEEE Applied Power Electronics Conference and Exposition*, 2000. *APEC 2000*. vol. 2. DOI: 10.1109/APEC.2000.822610 (2000) pp. 889-894 vol. 2.

\* cited by examiner

POWER CONVERTER WITH DUAL RING NETWORK CONTROL

FIELD OF DISCLOSURE

This disclosure relates to power converters, and in particular, to the coordinated control of multiple power converters.

BACKGROUND

Power converters are often used to convert power from one form to another. These power converters typically have maximum power ratings. However, in some applications, the power to be processed is greater than that which can be handled by a power converter.

One way to solve this problem is to simply build a power converter that can handle more power. However, this can be technically difficult, and depending on the demand for such converters, it can be poor business practice.

Another way to realize a power converter with high power rating is to connect multiple lower-rated power converters in parallel. For the lower-rated converters to co-operate in achieving a higher power rating, the switching operation of switching devices (typically insulated gate bipolar transistors) is coordinated at nearly all times. In particular, the switching operation is controlled so that outputs of each of the lower-rated power converters are maintained in phase relative to each other.

In some cases, power converters communicate amongst themselves on two channels: a first channel for transmission of a synchronization signal, and a second channel, such a as a CAN serial bus, for exchange of control data. In this configuration, a master power converter broadcasts a pulse periodically for a slave power converter to use as a reference for a phase locked loop, along with data exchange of commands for control execution.

In other instances, Industrial Ethernet protocols incorporate synchronization and data exchange onto the Ethernet physical layer (e.g., Cat 5 cable and related connectors). For instance, Powerlink, Sercos III, and EtherCAT may be used for coordination of soft paralleled power converters. Beyond this configuration, a custom protocol may be built on top of a conventional Ethernet hardware layer.

SUMMARY

In one aspect, the invention features a method for providing electric power to a power system, such as an electric power grid, or an electric machine. Such a method includes receiving, at a slave node of a power converter having a plurality of slave nodes, a first synchronization signal via a first communication channel, the first synchronization signal purporting to represent a master timing characteristic of a master control node of the power converter; receiving, at the slave node of the power converter, a second synchronization signal via a second communication channel, the second synchronization signal purporting to represent a master timing characteristic of the master control node of the power converter; synchronizing an internal timing characteristic of the slave control node with the master timing characteristic of the master control node using the first synchronization signal; determining that the first synchronization signal is invalid; and synchronizing an internal timing characteristic of the slave control node with the master timing characteristic of the master control node using the second synchronization signal.

In some practices of the method, determining that the first synchronization signal is invalid includes comparing a master timing characteristic represented by the first synchronization signal with a first timing characteristic of a first phase locked loop of the slave node.

Other practices include receiving, at the slave control node, a first time-of-flight signal via the first communication channel, and a second time-of-flight signal via the second communication channel. Among these are practices in which determining that the first synchronization is invalid includes determining that the value of the first time-of-flight signal is outside a predetermined range, practices in which determining that the first synchronization is invalid includes determining that at least one of a plurality of time-of-flight signals received via the first communication channel is outside a predetermined range, practices in which determining that the first synchronization is invalid includes: comparing the master timing characteristic represented by the first synchronization signal with a first timing characteristic of a first phase locked loop of the slave control node, the first timing characteristic having been compensated the first time-of-flight signal, and practices that also include simultaneously enabling a circuit pathway for either the first synchronization signal and the first time-of-flight signal or the second synchronization signal and the second time-of-flight signal.

Yet other practices of the method include receiving a first data packet via the first communication channel and a second data packet via the second communication channel.

In other practices, receiving the first synchronization signal includes receiving the first synchronization signal from a first adjacent slave control node, and receiving the second synchronization signal includes receiving the second synchronization signal from a second adjacent slave control node. Among these practices are those which further include sending the first synchronization signal via the first communication channel to the second adjacent slave control node, and sending the second synchronization signal via the second communication channel to the first adjacent control node.

Additional practices include those in which the power system includes an electric power grid, those in which the power system includes an electric machine, those in which the power system includes an array of solar electric panels, those in which the power system includes an energy storage system such as batteries, fuel cells or flywheels, and those in which the power system includes a wind turbine.

Another practice includes selecting a time interval between synchronizing an internal timing characteristic of the slave control node with the master timing characteristic of the master control node using the first synchronization signal and synchronizing an internal timing characteristic of the slave control node with the master timing characteristic of the master control node using the second synchronization signal such that an extent of deviation of the internal timing characteristic remains below a selected threshold.

In another practice, the switch between using one synchronization signal and the other occurs in real time.

In another aspect, the invention features an apparatus for controlling an electric power converter having a plurality of nodes, of which one node is a master control node. Such an apparatus includes: first evaluation circuitry connected to a first communication channel between two nodes in the power converter, the first evaluation circuitry being configured to evaluate validity of a first synchronization signal received via the first communication channel, the first synchronization signal purporting to represent a master timing characteristic of the master control node of the power converter; second evaluation circuitry connected to a second communication channel between the two nodes in the power converter, the second evaluation circuitry being configured to evaluate validity of a second synchronization signal received via the second communication channel, the second synchronization signal purporting to represent the master timing characteristic of the master control node of the power converter; selection circuitry in communication with the first evaluation circuitry and with the second evaluation circuitry, the selection circuitry being configured to define, based at least in part on an output of the first evaluation circuitry and an output of the second evaluation circuitry, a selected communication channel from a group consisting of the first communication channel and the second communication channel; and a timing module configured to synchronize an internal timing characteristic of the control node with the master timing characteristic, wherein the master timing characteristic is deemed to be represented by a synchronization signal carried by the selected communication channel.

In some embodiments, the first evaluation circuitry includes first time-of-flight circuitry configured to evaluate validity of a first time-of-flight signal received via the first communication channel, and the second evaluation circuitry includes second time-of-flight circuitry configured to evaluate validity of a second time-of-flight signal received via the second communication channel. Among these are embodiments in which the first evaluation circuitry is configured to determine whether a value of the first time-of-flight signal is within a predetermined range.

Embodiments of the invention also include those in which the first evaluation circuitry includes first phase locked loop circuitry having a first timing characteristic locked to a master timing characteristic purportedly represented by a first synchronization signal, and the second evaluation circuitry includes second phase locked loop circuitry having a second timing characteristic locked to a master timing characteristic purportedly represented by the second synchronization signal.

In some of these embodiments, the bandwidth frequencies of the phase locked loops are selected such that an extent of a disturbance caused by switching between the first and second communication channels is smaller than a selected threshold. In some of these embodiments, the bandwidth frequencies of the phase locked loops are much lower than the frequencies associated with a disturbance caused by switching between the two communication channels. The extent to which they are much lower would depend on the selected threshold. As a result of this feature, switching between channels introduces minimal disturbance, thus enabling channel-switching to occur during real time operation.

Additional embodiments include those in which the selection circuitry includes a switch configured to switch between a first connection and a second connection, the first connection being a connection between the timing module and the first synchronization signal, and the second connection being a connection between the timing module and the second synchronization signal, wherein the first synchronization signal is received from a first adjacent control node and the second synchronization signal is received from a second adjacent control node.

Still other embodiments include first output circuitry configured to send the first synchronization signal via the first communication channel to an second adjacent control node; and second output circuitry configured to send the second synchronization signal via the second communication channel to the first adjacent control node.

In another aspect, the invention features an apparatus for providing an output voltage waveform to a power system. Such an apparatus includes a plurality of power converters, each of which includes a plurality of switching devices, each of which is configured to generate a voltage waveform to be combined with other voltage waveforms to generate the output voltage waveform to be provided to the power system; a plurality of control nodes, each of which is associated one of the corresponding plurality of power converters, each of the control nodes being configured to control operation of the one of the corresponding plurality of power converters; a first ring network for providing communication between the control nodes in a first direction; a second ring network for providing communication between the control nodes in a second direction opposite to the first direction; wherein each of the control nodes includes means for ignoring data provided on one of the first and second ring networks at least in part on the basis of a determination of validity of the data provided on the first and second ring networks.

In general, effective switching device coordination involves both a tight synchronization of events within each of the lower-rated converters and a cycle-by-cycle sharing of control algorithm data. Examples of events that may require tight synchronization include analog-to-digital converter (ADC) sampling and the beginning and/or ending of the power device modulation periods. Data to be shared includes ADC measurement values, control algorithm inputs and/or outputs, and state machine status.

The dual ring network topology described herein is robust enough to, in most cases, continue operation with a single point of failure, and to thus maintain synchronization upon failure of a single node or connection. Furthermore, upon start-up, one can designate any node to act as a master node. As a result, in many cases the system can continue to operate in most cases even with the loss of a master node.

The synchronization protocol reduces the likelihood of malfunction arising from occasional spurious packets while also allowing for quick detection of complete channel loss and enabling smooth transitions between two redundant loops channels as needed. In one embodiment, the network is a ring network and the redundant loops are clockwise and counter-clockwise channels.

The synchronization protocol also inherently tends to compensate for delays in signal propagation and processing, thereby minimizing or eliminating synchronization error. Tight synchronization between nodes (e.g., less than ±100 ns) can thus be achieved. The synchronization period itself is selectable between 1 and 10 kHz.

The dual ring network topology described herein can support synchronization and data exchange requirements for many parallel converters (e.g., 3 nodes, more than 3 nodes, or more than 8 nodes). There is zero control cycle latency for sharing of data between nodes: a data exchange rate of 1.25 Gb/s on a serial channel supports a 124 byte datagram from each node per exchange, and less than 50 µs needed for a full exchange of data for an eight node system.

The dual ring network described herein can be adapted to applications in smart sensors, smart power poles, or other synchronized subsystems within a power converter. The dual ring network can also be adapted to a master-less system. The dual ring network is physical layer independent and inter-node communication can be effected via any reasonable mode of communication.

Other features and advantages of the invention are apparent from the claims and from the following description and its accompanying figures, in which:

DETAILED DESCRIPTION

Figure 1:
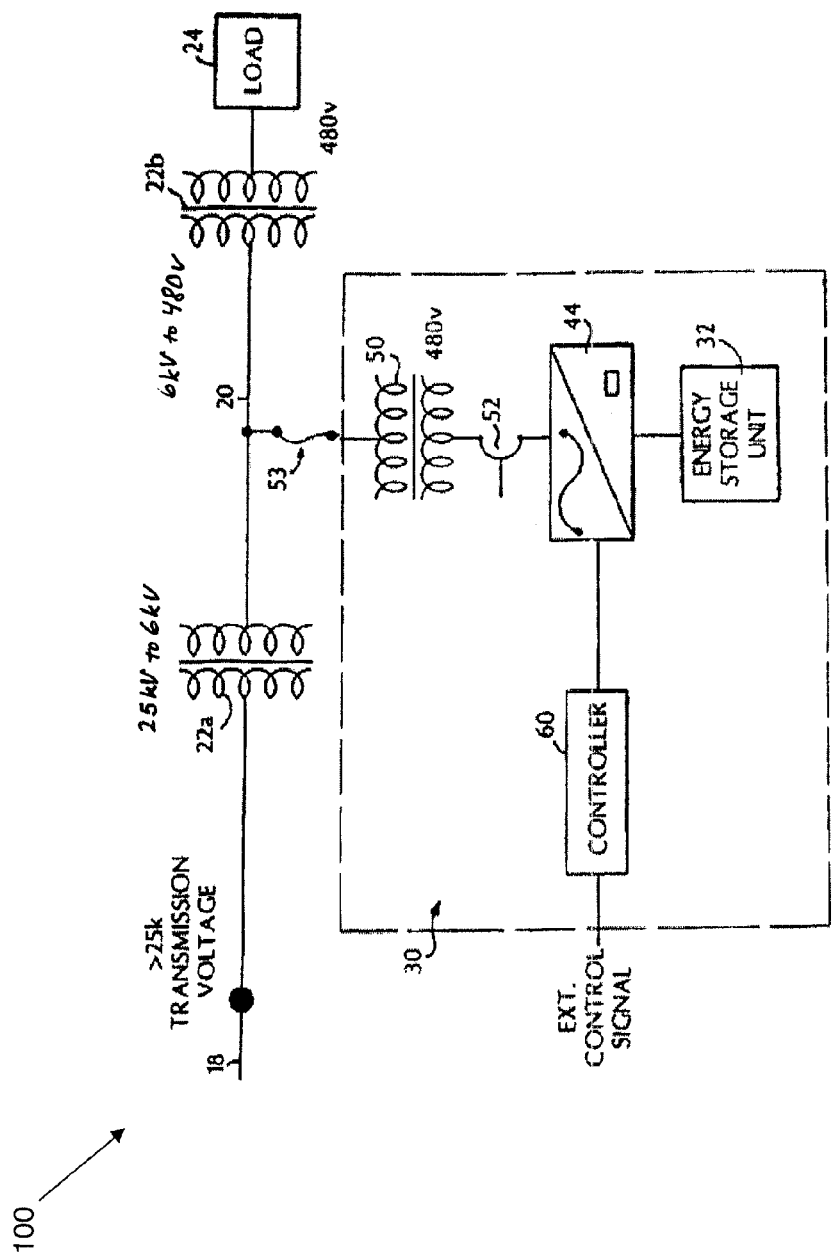
FIG. 1 is a block diagram of a power transmission system.

Referring to FIG. 1, in a power transmission system 100, a power compensation system 30 is connected in shunt with a distribution line 20 of a utility power network. The distribution line 20 connects to a transmission line 18 on a transmission line network through a first transformer 22a, which reduces the relatively high voltage (e.g., >25 kV) to a lower voltage (e.g., 6-25 kV) carried on the distribution line 20. A second transformer 22b reduces the transmission line voltage to a voltage suitable for a load 24 (e.g., 480 V).

The power compensation system 30 includes an energy storage unit 32, a converter system 44, and a controller 60 for controlling the converter system 44. The converter system 44 includes a plurality of converters (e.g., inverters) connected in parallel to achieve a power rating that is higher than that of its individual constituent converters. The converter system 44 connects to the distribution line 20 via one or more step-down power transformers 50, one or more switchgear units 52, and a fuse 53.

Figure 2A:
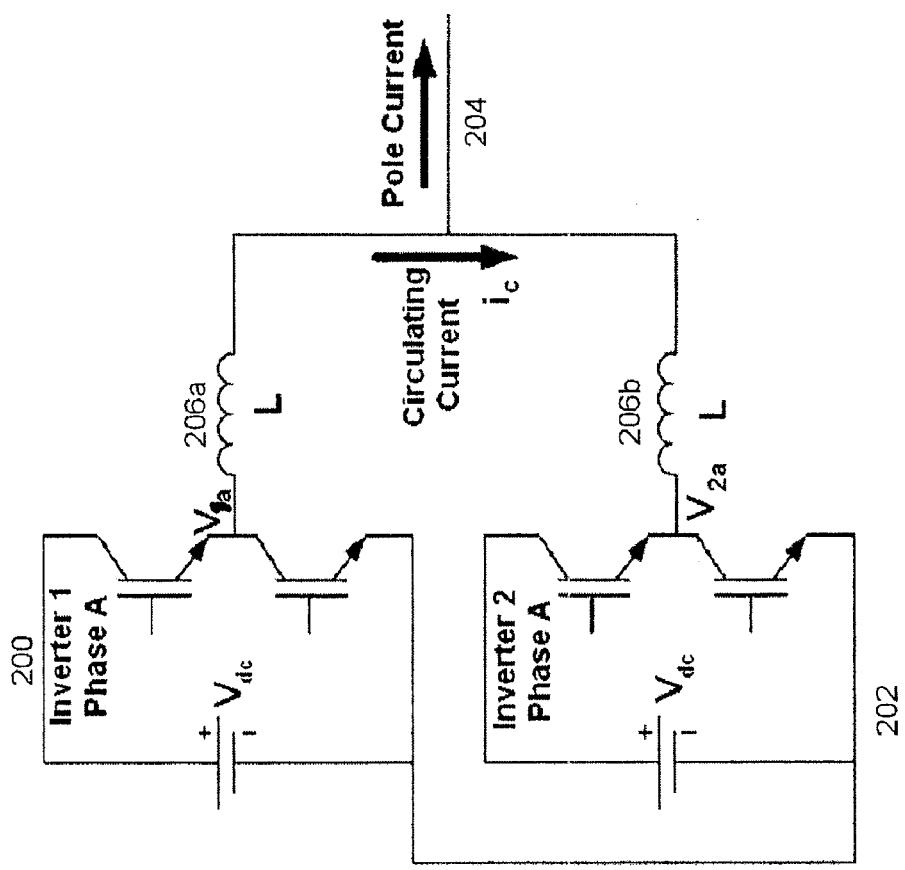
FIGS. 2A and 2B show two switching devices and a current plot illustrating the effect of poor synchronization between switching devices.
Figure 2B:
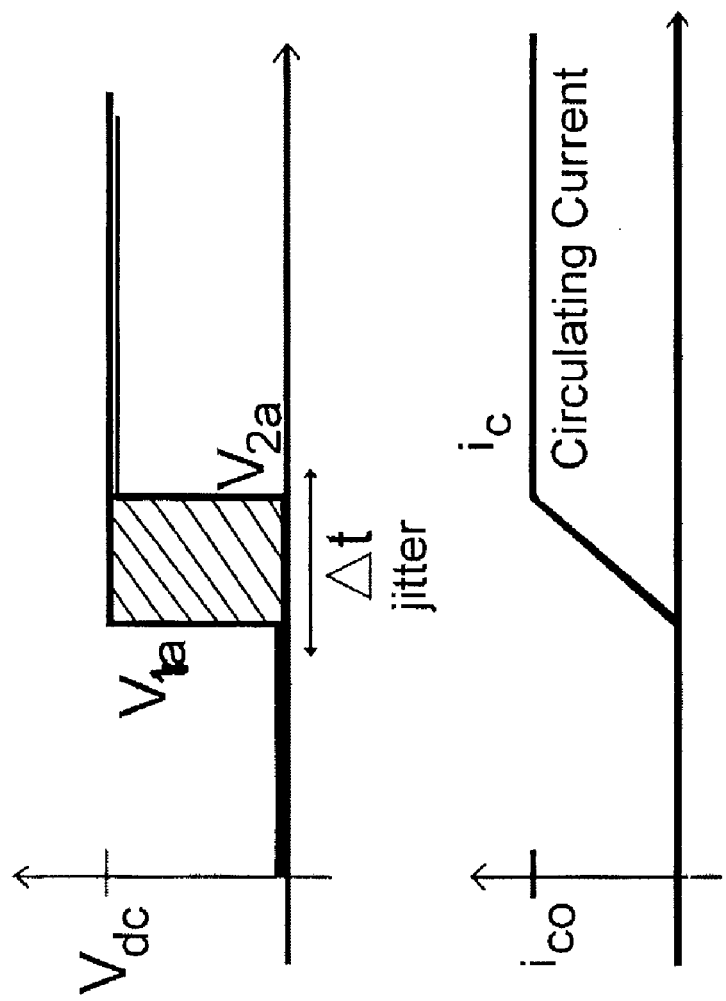

Referring to FIG. 2A, when synchronized correctly, a first inverter 200 and a second inverter 202 output voltage waveforms having the same phase. These cooperate to generate a pole current along an output line 204. If the first and second inverters 200, 202 are poorly synchronized, i.e. if they are out of phase, a time lag Δt, referred to as jitter and shown in FIG. 2B, occurs between the voltage cycle of the first inverter 200 (represented as $V_{1a}$) and the voltage cycle of the second inverter 202 (represented as $V_{2a}$). This jitter generates a circulating current $i_c$:

$$i_c = \frac{V_{dc} \Delta t}{2L},$$

where L is the inductance of first and second inter-phase inductors 206a, 206b coupled to first and second inverters 200, 202 respectively. The circulating current $i_c$ can, to some extent, be mitigated by increasing the inductance of the inter-phase inductors 206a, 206b.

Similarly, the performance of a power converter control algorithm may suffer when sampled values at one converter in a paralleled system are not shared with other converters in the same control cycle, but rather one or two cycles later. This delay often reduces achievable bandwidth of the control algorithms and compromises dynamic response.

Dual Ring Network Overview

Figure 3:
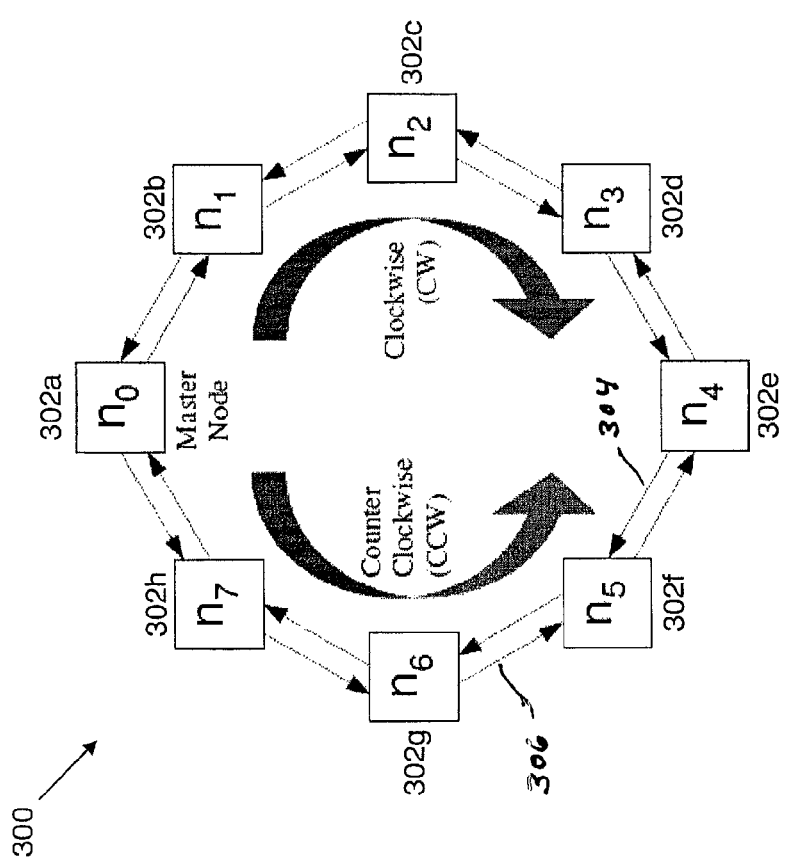
FIG. 3 is a block diagram of a dual ring network.

Referring to FIG. 3, a dual ring network 300 enables tight synchronization and low latency exchange of data among a plurality of converters. In the illustrated embodiment, eight nodes 302a-302h, each of which corresponds to a single converter, serially interconnect to form both a clockwise channel 304 and a counterclockwise channel 306. This results in a dual ring interconnection topology. The protocol and topology described herein for synchronization and communication among the nodes 302a-302h in a dual ring network 300 are not, however, limited to configurations with eight nodes. A dual ring network 300 as described herein can be constructed from fewer than eight nodes or more than eight nodes.

Within the dual ring network 300, one node serves as a master node; the remaining nodes are serve as slave nodes 302b-302h. The particular node that is to function as a master node 302a is assigned before network startup and may be reassigned when the operation of the network 300 is stopped. The slave nodes 302b-302h are not operational without a functioning designated master node 302a.

As described in more detail below, the serial connections between nodes 302a-302h are used, during dedicated time slices, to exchange both synchronization packets and data packets. In order to provide communication in both a clockwise direction, for the clockwise channel 304, and in a counter-clockwise direction, for the counter-clockwise channel 306, each of the node-to-node connections is fully duplex. As a result, the network 300 is robust to either the loss of a single node or the loss of a single connection. Thus, if an arbitrary node 302i were to become disabled, the duplex connections between nodes 302a-302i in the dual-ring network would still permit signals from the master node 302a to arrive at nodes 302b and 302c via the clockwise channel 304 and to arrive at nodes 302e-302h via the counter-clockwise channel 306. For similar reasons, the disruption of one inter-node connection would not prevent signals from being transmitted between the master node 302a and any of the slave nodes 302b-302h.

A clock in the master node 302a generates a local oscillating square wave, e.g., at 10 kHz. The master node 302a uses this clock to transmit a reference synchronization packet on both the clockwise channel 304 and the counter-clockwise channel 306 at a predetermined exchange frequency, which is selectable between 1 and 10 kHz. The slave nodes 302b-302h receive this synchronization packet and use information contained therein to generate their own oscillating clock, which is locked to that of the master node 302a.

Figure 4:
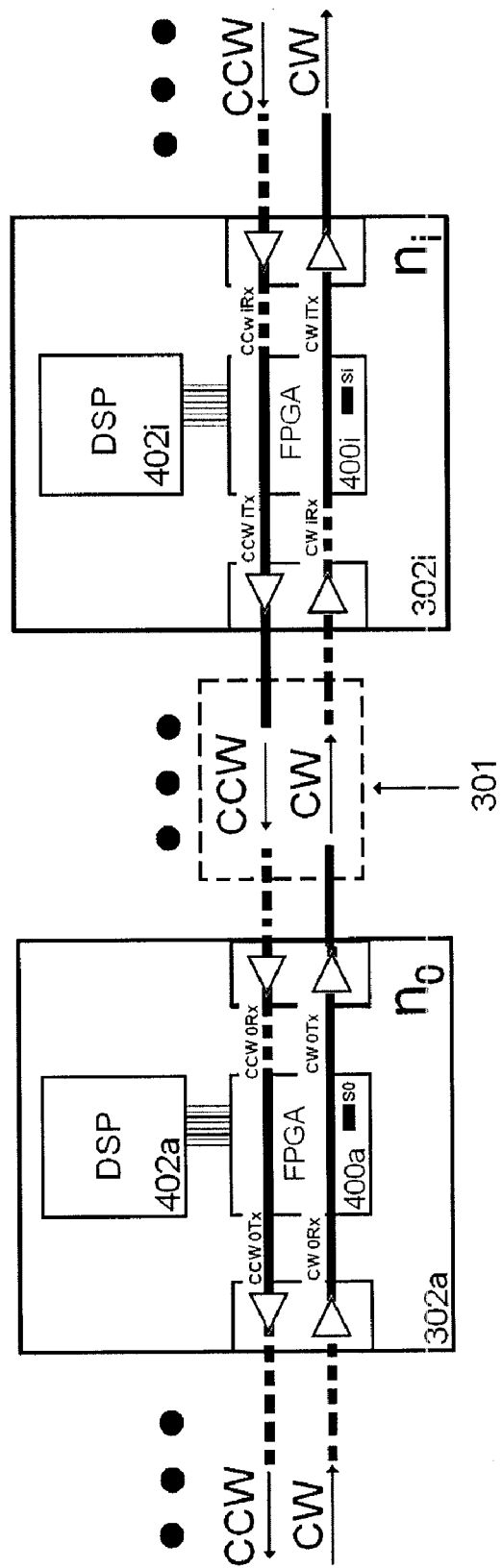
FIG. 4 is a block diagram of nodes in a dual ring network.

Referring to FIG. 4, in one embodiment, full duplex connections 301 between nodes 302a-302h. Such connections can be implemented by full duplex optical transceivers and fiber-optic cables. Exemplary optical transceivers are those available from Avago (San Jose, Calif.) and sold under the name AFBR series Small Form Pluggable (SFP) modules (part number AFBR-57RAPZ) with diagnostic capabilities. Such transceivers are commonly used in Gigabit Ethernet applications. In other embodiments, other serial communication channels and media may be used, such as low-voltage differential signaling (LVDS), Cat5 cable (Ethernet), or any other type of copper connection.

Inter-node exchange of synchronization and data packets is managed by a field programmable gate array (FPGA) 400a-400h on each node. A FPGA 400a-400h may be a serializer/deserializer (SerDes) on a Xilinx (San Jose, Calif.) Virtex 5 or Spartan 6 family FPGA. For example, a development kit part number AES-XLX-V5LXT-PCIE50-G available from Avnet (Phoenix, Ariz.) may be used. The FPGA 400a-400h on each node extracts data, including transmitted synchronization data, and passes that data to a digital signal processor (DSP) 402a-402h and to other modules in the FPGA 400a-400h. These modules include, for example, a pulse-width modulation (PWM) module and an analog-digital converter (ADC) timing module. The FPGAs 400a-400h have built-in transceiver logic and link management firmware, such as Aurora Link (Xilinx), which uses 8b10b encoding to packetize data and provide an asynchronous clock connection between FPGAs 400a-400h on adjacent nodes, and which operates at 1.25 Gb/s.

Figure 5:
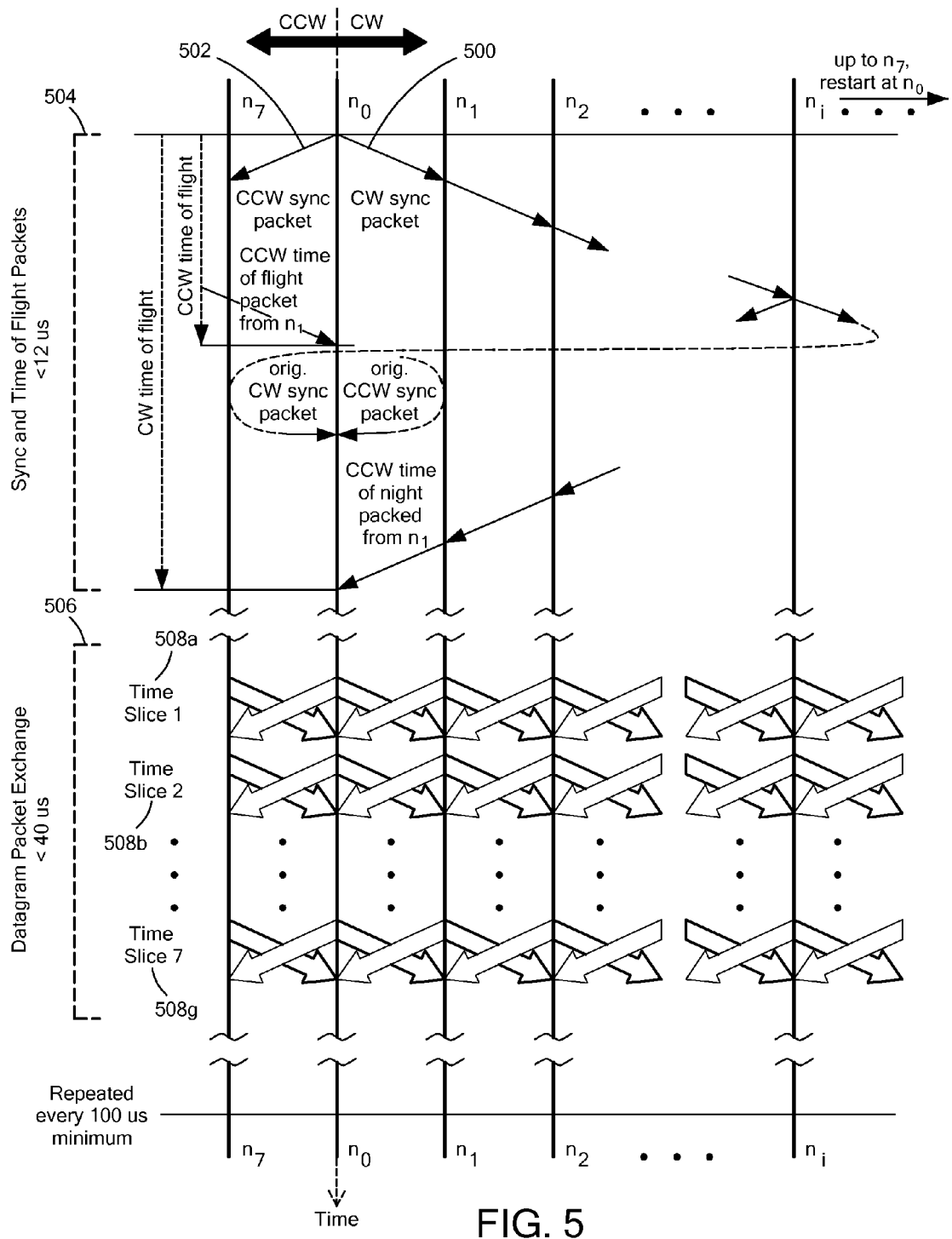
FIG. 5 is a schematic diagram of the timing of inter-node communication in a dual ring network.

Referring to the top portion of FIG. 5, each cycle is divided into a synchronization period 504 and a datagram packet exchange period 506. The data exchange period 506 begins at a prescribed time after the synchronization period 504. For instance, in a data ring network 300 having a 100 μs cycle period, the first 12 μs are designated as a timing period 504 and the remaining 88 μs are designated as a data exchange period 506.

During the synchronization period 504, the master node 302a, designated as $n_0$ in FIG. 5, sends synchronization packets at predetermined intervals in both the clockwise direction, using the clockwise channel 304 and in the counterclockwise direction, using the counterclockwise channel 306. An internal clock (e.g., running between 1.0 and 10 kHz) in the master node $n_0$ indicates when to begin transmission of synchronization packets on both the clockwise and counter-clockwise channels 304, 306.

At the start of each transmission cycle, the master node $n_0$ sends a first synchronization packet 500 in the clockwise direction to node $n_1$ and a second synchronization packet 502 in the counter-clockwise direction to node $n_7$. Nodes $n_1$ and $n_7$ update the timing of their respective internal clocks based on the information carried in the packet, as discussed in greater detail below. Nodes $n_1$ and $n_7$ then forward the packet on to their neighboring nodes in the appropriate direction (i.e., nodes $n_2$ and $n_6$, respectively) until both the first and second synchronization packets return to the master node $n_0$.

To account for the transmission time of each synchronization packet from the master node $n_0$ to a given slave node $n_i$, the master node $n_0$ periodically transmits time-of-flight (time-of-flight) packets. In addition, the master node $n_0$ periodically transmits a request for a return pulse from an arbitrary one of the slave nodes $n_i$.

Upon receiving a synchronization packet from the master node $n_0$, a slave node $n_i$ returns an echo packet to the master node $n_0$ in the direction opposite to the direction from which it received the synchronization packet. The master node $n_0$ uses this echo packet to determine the time-of-flight for the original synchronization packet that it sent to the slave node $n_i$ in that direction. On the basis of that determination, the master node $n_0$ sends updated time-of-flight calibration information to the slave node $n_i$. The slave node $n_i$ then uses the time-of-flight data to correct its own internal clock to account for transit time required by a synchronization packet as it makes its way from the master node $n_0$ to the slave node $n_i$. In this way, the dual ring network 300 continually updates time-of-flight data to account for drift due to unpredictable causes, such as temperature and other environmental changes.

During the data exchange period 506, the nodes 302a-302h exchange data, such as measured inputs, operating modes, and control algorithm instructions.

The data exchange period 506 is divided into time-slices 508a-508g. In a first time slice 508a, each node 302a-302h sends its own packet of data to its neighbors in the clockwise direction, using the clockwise channel 304, and in the counterclockwise direction, using the counter-clockwise channel 306. In a second time slice 508b, each node 302a-302h forwards the data it received from the counter-clockwise and clockwise directions during the first time slice 508a onward in the counter-clockwise and clockwise directions, respectively.

Figure 6:
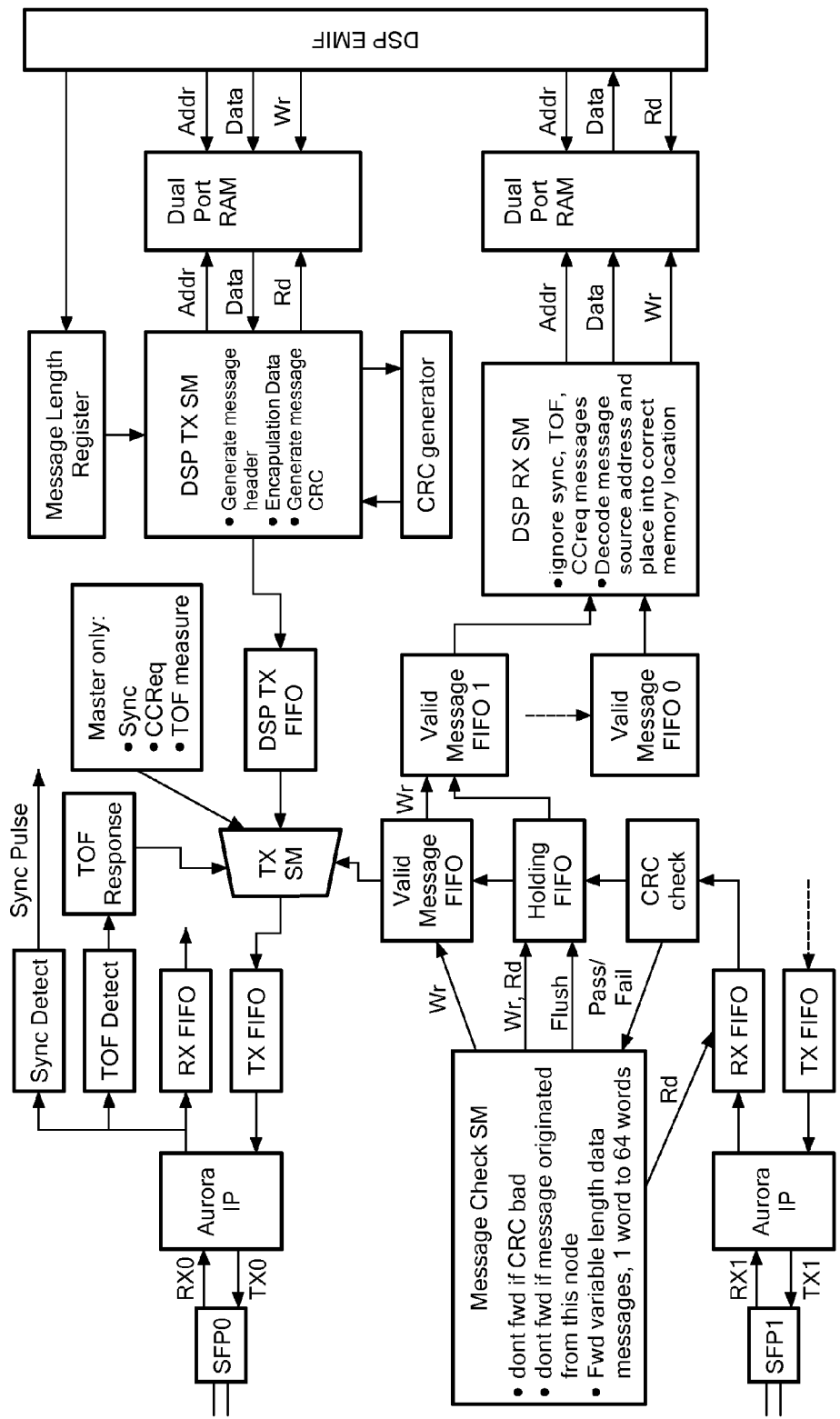
FIG. 6 is a block diagram of a data path in a field-programmable gate array.

FIG. 6 shows the data processing path within a typical FPGA 400a-400h. The presence of both clockwise and counter-clockwise paths around the dual ring network 300 allows the receiving FPGA 400a-400h in each node 302a-302i to perform a cyclic redundancy check (CRC) of packets received from the clockwise direction and packets received from the counterclockwise direction. The node 302a-302i can then choose which of these two packets it deems, based on the CRC check, to be the more reliable. The data exchange protocol directly allows the CRC check to be replaced by an error correction algorithm, such as forward error correction (e.g., Reed-Solomon) or a similar algorithm.

Data exchange packets on the dual ring network 300 carry 124 bytes. The output data from the network exchange is presented in a contiguous address space (DRAM). Each FPGA 400a-400h presents only "good" and "fresh" data to the DRAM, and indicates whether the data does not meet these criteria. Direct Memory Access (DMA) can be coordinated with the network data exchange process to move data to/from a DSP local memory with near-zero processor overhead.

Synchronization Logic

Figure 7:
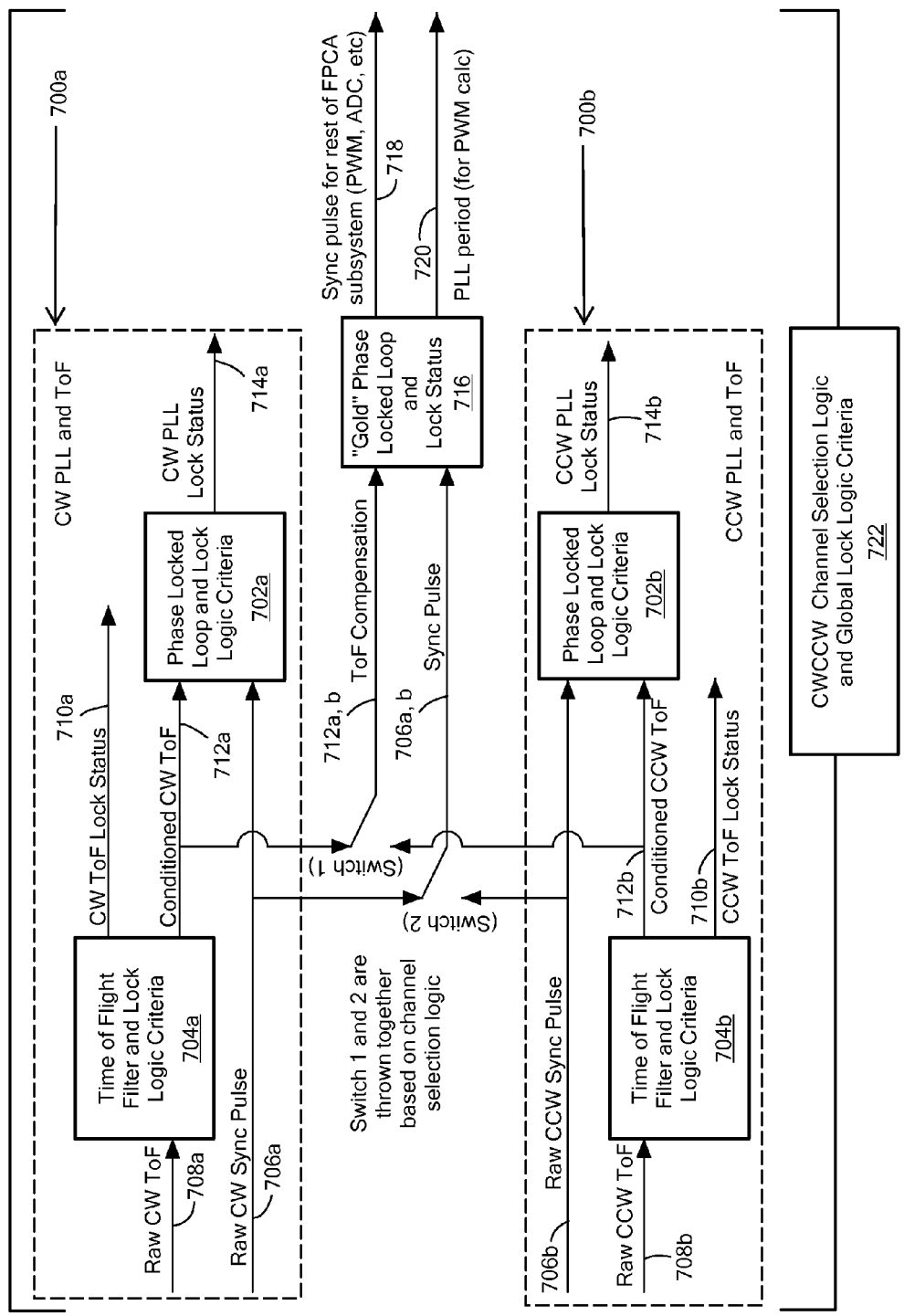
FIG. 7 is a block diagram of an exemplary node in a dual ring network.

As shown in FIG. 7, the synchronization logic on each node includes clockwise circuitry 700a and counterclockwise circuitry 700b.

A phase locked loop (PLL) logic module 702a, 702b and a time-of-flight filter 704a, 704b in each of clockwise and counter-clockwise circuitry 700a, 700b, respectively, monitor the locked status, or overall robustness of the clockwise and counter-clockwise channels 304, 306.

The PLL modules 702a, 702b receive raw clockwise and counter-clockwise synchronization pulses 706a, 706b, respectively, from a neighboring node in the appropriate direction. Based in part on these pulses 706a, 706b, the PLL modules 702a, 702b determine whether the synchronization information received via the clockwise and counter-clockwise channels 304, 306 is suitable for use or indicative of a problem in the dual ring network 300.

Similarly, time-of-flight filters 704a, 704b, described in more detail in connection with FIG. 8, receive raw clockwise and counter-clockwise time-of-flight packets 708a, 708b, respectively, from the appropriate neighboring nodes. After processing the raw time-of-flight packets 708a, 708b, each time-of-flight filter 704a, 704b outputs a time-of-flight lock status signal 710a, 710b. The time-of-flight lock status signal 710a, 710b is sent to the lock detection logic. Each time-of-flight filter 704a, 704b also outputs conditioned time-of-flight signals 712a, 712b, which are sent to the corresponding PLL module 702a, 702b to enable that PLL module 702a, 702b to compensate for the propagation time of the synchronization signal around the dual ring network 300.

Each PLL module 702a, 702b locks its frequency and phase based on both its received raw synchronization pulse 706a, 706b and any required compensation for time-of-flight based on its conditioned time-of-flight signal 712a, 712b. The PLL module 702a, 702b outputs compensated lock status signals 714a, 714b, which are locked to the master node reference to within ±100 ns. The determination of the lock status of the PLL modules 702a, 702b is described in greater detail below in conjunction with FIG. 9.

A third PLL module 716, referred to as a "gold" PLL, generates an output synchronization pulse 718 and a PLL period output 720, both of which are used for other timing related components within the FPGA 400a-400h (e.g., ADC reads) and latched output (e.g., PWM, gate signals, etc.). The time-of-flight lock status signals 710a, 710b and PLL lock status signals 714a, 714b are used to determine which (if any, or if both) of the clockwise and counter-clockwise channels 304, 306 is robust and thus which raw synchronization pulse 706a, 706b and conditioned time of flight signal, 712a, 712b, is suitable for use by the gold PLL 716.

Channel selection logic 722 selects one of the raw synchronization pulses 706a, 706b and one of the conditioned time-of-flight signals 712a, 712b from the locked direction and sends them to the gold PLL 716. If the selected channel comes out of lock (e.g., due to a cable pull, lost node, repeated corrupt data, or other disruption), the synchronization pulse and time-of-flight compensation inputs into the gold PLL 716 will be switched by channel selection logic 722 in real time to the other channel, if available and suitable for use. The channel selection logic 722 switches both the synchronization pulse and the time-of-flight input simultaneously. Thus, even if a given node were to have a large synchronization pulse propagation delay in one direction around the ring (but not in the other direction), this delay would be instantly compensated by the corresponding time-of-flight signal upon switching of the channel. This simultaneously switching produces effectively zero net change in the phase of the output from the gold PLL 716.

The ability to switch between synchronization pulses 706a, 706b and between corresponding time-of-flight signals 712a, 712b arises in part because the bandwidth frequency of the phase locked loops in the PLL modules 702a, 702b is much lower than the frequency content of the transient irregularities that arise when executing the switch. As a result, these irregularities are not manifested at the output of the gold PLL 716.

The dynamics of the PLL modules 702a, 702b; time-of-flight filters 704a, 704b; and lock logic criteria selected together cooperate to provide considerable immunity from occasional spurious packets, to allow for the quick detection of complete channel loss, and to enable a smooth transition of the gold PLL 716 between clockwise and counter-clockwise directions in the event of a small angle difference between the respective signals. An overall state machine manages system startup and ensures that the gold PLL 716 locks prior to data exchange.

Figure 8:
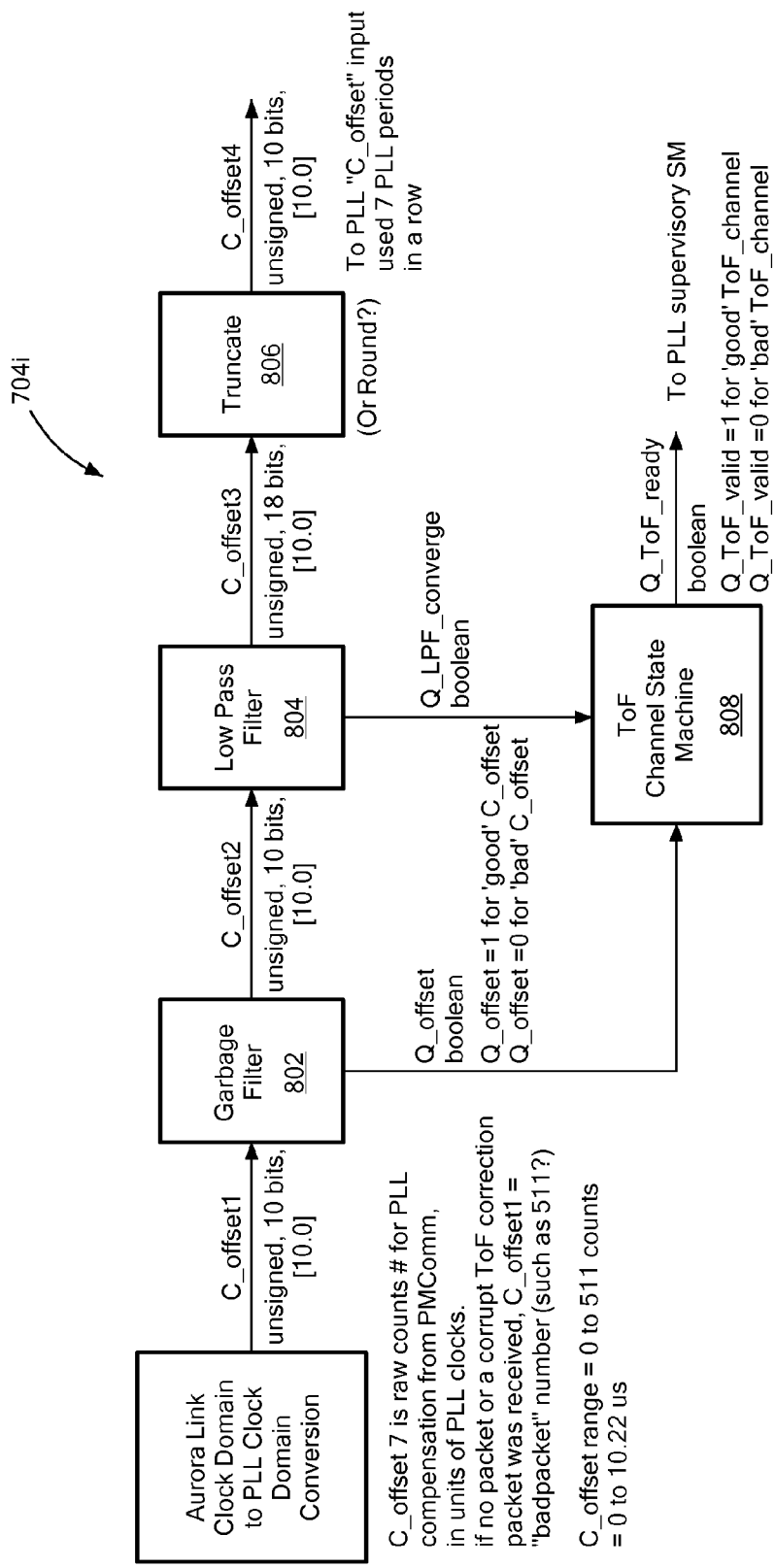
FIG. 8 is a block diagram of a representative time-of-flight filter block in the node of FIG. 7.

Referring to FIG. 8, in general, lock of each time-of-flight filter 704a, 704b is determined based on whether a series of raw time-of-flight values received from the master node 302a is consistent within an acceptable range of error. More specifically, a raw time-of-flight value (represented here as C_offset1) sent from the master node 302a is received by a representative time-of-flight filter 704i in one of the nodes 302b-302h of the dual ring network 300. The value of C_offset1 indicates to the PLL of that node an amount of time (e.g., 2 μs) by which to advance or hold back in order to synchronize with the master timing clock.

A garbage filter 802 receives C_offset1 and determines whether the value of C_offset1 is within predetermined bounds. If the garbage filter 802 determines that C_offset1 is within an acceptable range, it outputs a value of a parameter C_offset2 that is equal to the value of C_offset1 and sets a Boolean flag Q_offset. Alternatively, if the garbage filter 802 determines that C_offset1 is out of bounds, it sets C_offset2 to be the last known good value of C_offset1 and clears the Q_offset flag.

A low pass filter (LPF) 804 receives C_offset2 and generates a Boolean output Q_LPF_converge indicative of whether a stream of recent time-of-flight values is within some predetermined bounds (i.e., indicative of the overall robustness of the stream of time-of-flight values). The LPF 804 also outputs C_offset3, which is the output of a low pass filter which is fed C_offset2. In response to receiving C_offset3 from the LPF 804, a truncation element 806 generates a truncated or rounded output C_offset4 and sends it to the PLL corresponding to the time-of-flight filter 704i.

A time-of-flight state machine 808 receives the Boolean outputs Q_offset and Q_LPF_converge from the garbage filter 802 and the LPF 804, respectively. Using a leaky bucket algorithm, the time-of-flight state machine 808 determines, based in part on Q_offset, whether too many out-of-bounds time-of-flight signals have been received within a predetermined period of time. Based on the result of the leaky bucket algorithm, which indicates a number of recent spurious time-of-flight signals, and the value of Q_LPF_converge, which indicates the consistency of recent time-of-flight signals, the state machine 808 determines the validity of the time-of-flight stream. The state machine 808 then outputs a Boolean signal Q_time-of-flight_ready, which is set if the time-of-flight channel is identified as robust and cleared otherwise.

Figure 9:
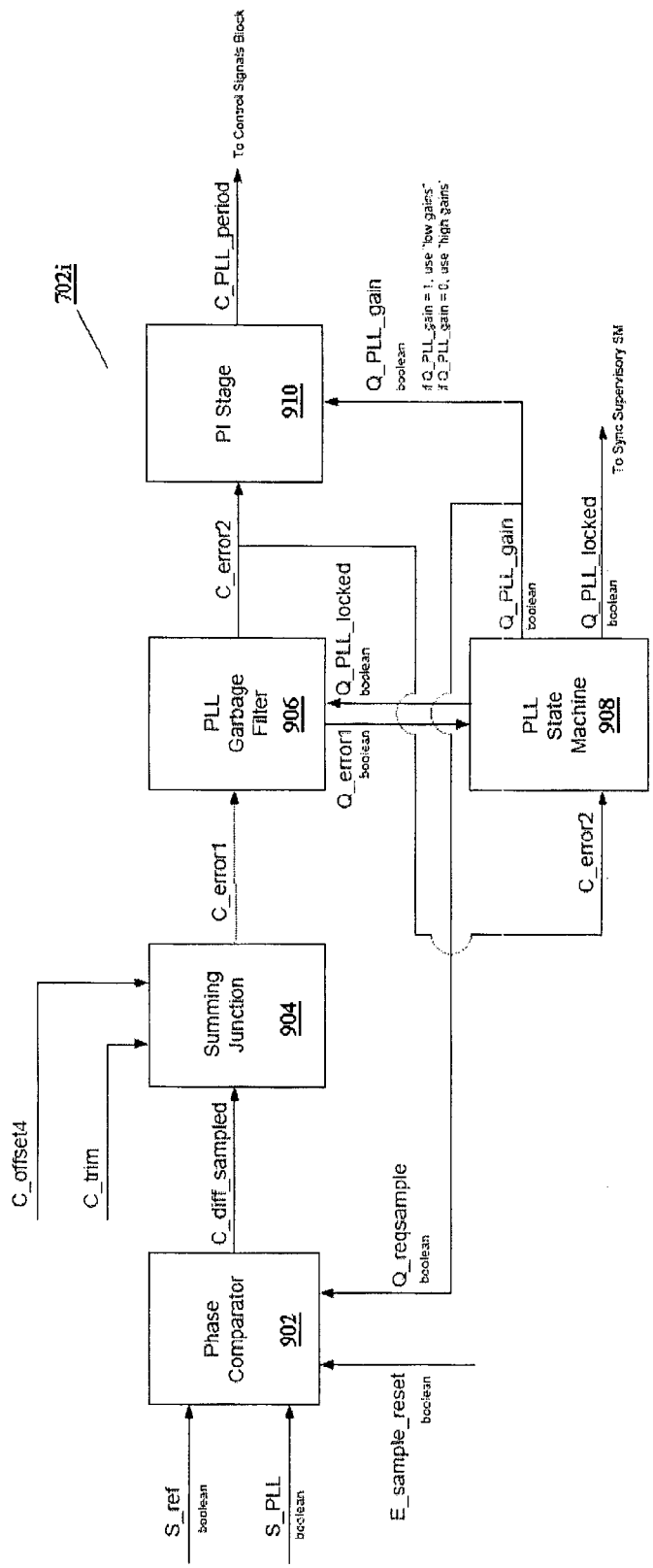
FIG. 9 is a block diagram of a representative phase locked loop block in the node of FIG. 7.

Referring to FIG. 9, a representative PLL module 702i in a node $n_i$ includes elements for synchronizing the timing of its corresponding node 302i with that of the master node 302a. The PLL module 702i includes a phase comparator 902 that receives two square wave signals, S_ref and S_PLL, which are representative of the timing of the master node 302a and the timing of node $n_i$, respectively, and outputs a signal C_diff_sampled that indicates the time difference between S_ref and S_PLL.

If the timing of the reference clock in the master node 302a and that PLL oscillator output, 912, of node $n_i$ are perfectly synchronized, C_diff_sampled is zero. However, because of the time-of-flight required for a synchronization signal from the master 302a to arrive at node $n_i$, C_diff_sampled is typically non-zero.

A summing junction 904 sums C_diff_sampled and C_offset4, the time-of-flight correction described above, to generate C_error1. When the PLL 702i is correctly locked to the master node 302a and the correct time-of-flight correction is used, C_error1 is zero; otherwise, C_error1 has a non-zero value indicative of the extent to which the PLL 702i fails to lock with the master node 302a.

A PLL garbage filter 906 uses C_error1 to determine whether the PLL lock can be relied upon. In particular, if the value of C_error1 is below a predetermined threshold, the garbage filter 906 outputs it as C_error2. If C_error1 is larger than the predetermined threshold, the garbage filter 906 instead sets C_error2 to be the last known good value for C_error1 and sets the Boolean flag Q_error1 to indicate a PLL locking failure.

The garbage filter 906 provides the values of C_error2 and Q_error1 to a PLL state machine 908, which operates in a manner similar to the time-of-flight state machine 808 described above.

Specifically, the PLL state machine 908 outputs parameters indicative of the overall robustness of the PLL 702i based on two factors: (1) a number of out-of-bounds error signals received in a given period of time (indicative of the overall robustness of the signal stream); and (2) the overall value of each individual error signal (indicative of the agreement between the timing system of node $n_i$ and the timing system of the master node $n_0$). This combination of factors gives stability to the PLL channel selection, and thereby tends to prevent occasional spurious synchronization signals from causing sudden and frequent channel switching. The values of C_error2 from the garbage filter 906 and the output from the PLL state machine 908 are fed into a proportional integral (PI) stage module 910, the gain of which can be adjusted to obtain the desired level of "inertia" for the PLL.

Referring again to FIG. 7, the gold PLL 716 receives a conditioned time-of-flight signal, which corresponds to C_offset4 of FIG. 8 (i.e., the time-of-flight signal after passing through garbage filter 802 and LPF 804). The gold PLL 716 also uses the raw synchronization pulses received from the master node 302*a*, rather than the adjusted signals processed by the PLL filter 702*i* described in FIG. 9.

Figure 10:
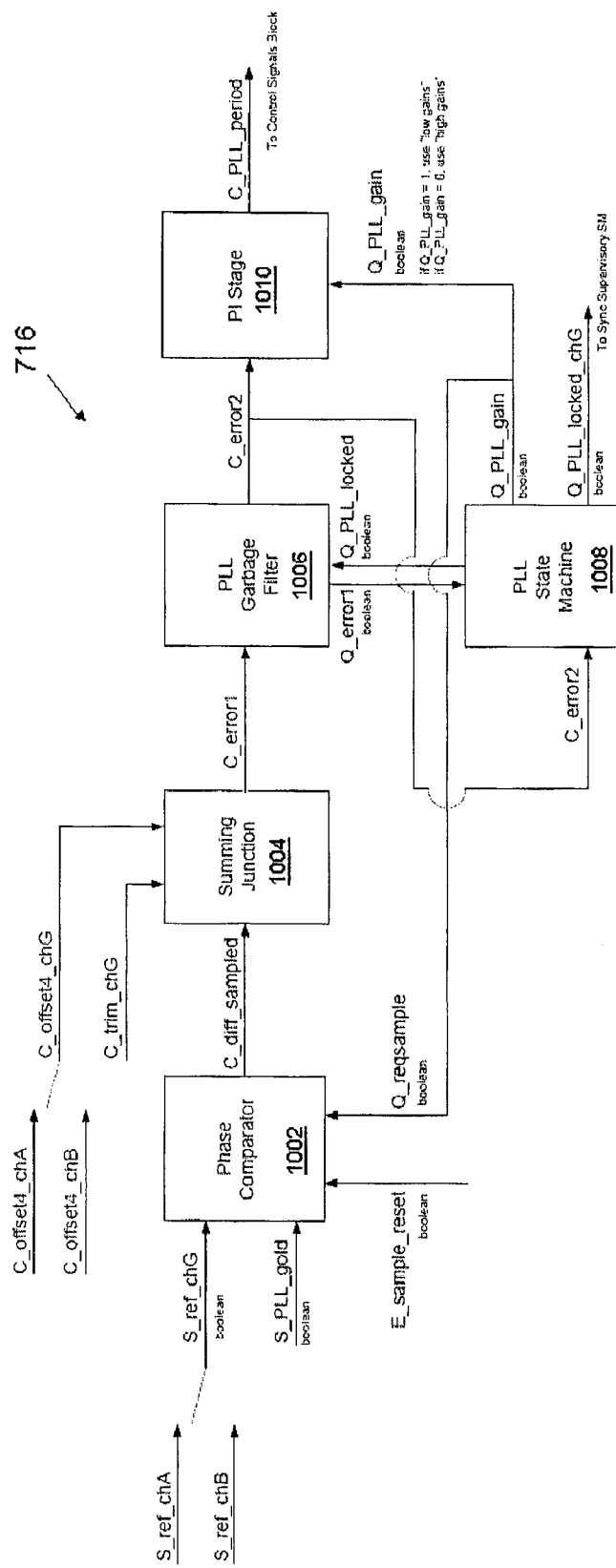
FIG. 10 is a block diagram of the gold phase locked loop block in the node of FIG. 7.

Referring to FIG. 10, the gold PLL 716 receives two sets of synchronization and time-of-flight signals. One set, S_ref_chA and C_offset4_chA, come from the clockwise channel 304; the others set, S_ref_chB and C_offset4_chB, come from the counter-clockwise channel 306. The input into the gold PLL 716 can be switched between clockwise channel 304 and counter-clockwise channel 306 depending on the overall robustness of the time-of-flight correction and PLL lock for each direction, as described above. A truth table is used to select between the clockwise channel 304 and the counterclockwise channel 306.

The operation of the gold PLL 716, including a phase comparator 1002, a summing junction 1004, a gold PLL garbage filter 1006, a gold PLL state machine 1008, and a gold PI module 1010, is substantially similar to the operation of PLL 704*i* described in connection with FIG. 9. In some cases, the settings for gold PLL garbage filter 1006 differ from those of an ordinary PLL garbage filter 906. The outputs C_PLL_period and Q_PLL_locked_chG from the gold PLL 716 are used to synchronize other timing systems of the FPGA 400*a*-400*h* with the master timing characteristic received via whichever one of the clockwise and counter-clockwise channel is selected at the time.

Alternative Embodiments

Figure 11B:
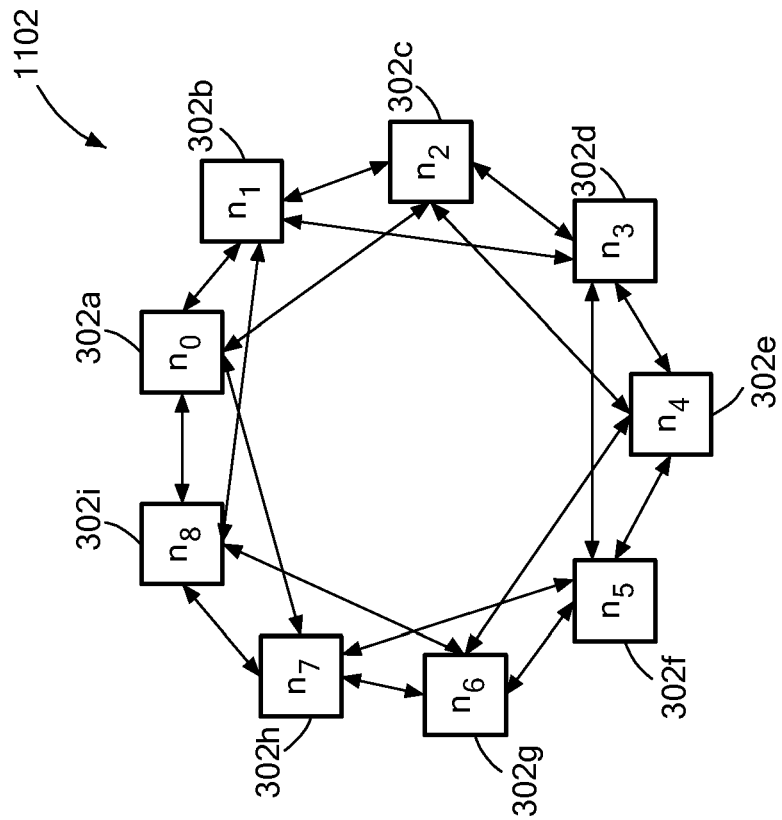
FIGS. 11A and 11B are block diagrams of alternative embodiments of a dual ring network.
Figure 11A:
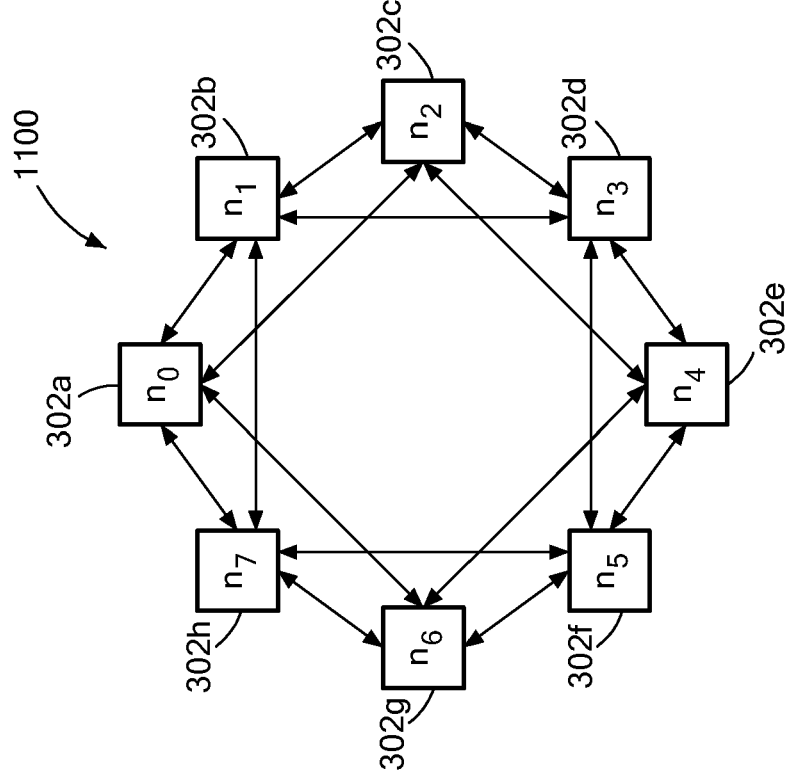

Referring to FIGS. 11A and 11B, in an alternative embodiment, the dual-ring network described above is augmented with extra connectivity that provides additional redundancy.

FIGS. 11A and 11B show two augmented dual-ring networks 1100, 1102 having an even number of nodes and an odd number of nodes respectively. In both of the augmented dual-ring networks 1100, 1102, each node $n_i$ is connected via primary connections to its neighboring nodes $n_{i-1}$ and $n_{i+1}$, as described above in connection with the standard dual-ring network 300. However, in addition, each node $n_i$ is also connected via backup connections to nodes $n_{i-2}$ and $n_{i+2}$. The backup connections give the augmented dual ring networks 1100, 1002 the ability to continue functioning despite a larger subset of node failure, thereby increasing the number of nodes that can fail before the ring is severed: 2 nodes in the worst case and N/2 nodes (rounded down) in the best case.

Nodes 302*a*-302*i* pass state data around the augmented ring network 1100, 1102 via their primary connections using the methods described above. However, during each time slice of data transfer, each node 302*a*-302*h* also duplicates its transmissions along the backup connections. For instance, a transmission sent along the $n_{i-1}$ link will also be sent along the $n_{i-2}$ link, and transmissions sent along the $n_{i+1}$ link will also be sent along the $n_{i+2}$ link.

By default, a node 302*a*-302*i* will process and forward state data messages received via its primary connections. However, during a given time slice, if a node 302*b* receives no state data (or receives an improperly formatted packet) on its primary connection, that node 302*b* interprets this lack of data (or receipt of invalid data) as an indication that the neighboring sending node 302*a* has failed. The node 302*b* then processes and forwards the state data message received from the backup connection instead, effecting a bypass of the failed node 302*a*.

Bypasses are effective only to a certain point. Once two neighboring nodes 302*a*, 302*b* fail, bypasses around these nodes are no longer possible, and the ring will be severed at that point. However, even with the failure of two nodes 302*a*, 302*b*, the system retains diminished functionality because either a clockwise or a counter-clockwise path between any two remaining operational nodes 302*c*-302*h* will still exist. However, if another pair of neighboring nodes 305*d*, 305*e* fails, and that pair is not directly adjacent to the first pair of failed nodes 302*a*, 302*b*, then at least one node 302*c* will become operationally isolated, and the ring network will fail.

Although described above for paralleled converters, tight synchronization and low latency exchange of data is also valuable for implementing coordinated switching in other power converter topologies, such as multilevel converters or, more generally, modular power converters. Additionally, a synchronization and data exchange mechanism may be valuable for the development of "smart" components within a converter, such as smart sensors or smart power poles.

As described in connection with FIG. 3, each node corresponds to a power converter. However, the method and system described herein can be applied to any system in which devices are expected to operate in synchrony with each other. Thus, the nodes can be other devices. For example, in some applications it may be desirable to obtain data at one location that corresponds to some event at another location. In that case, it is useful to synchronize the data acquisition with the event. In one such application, it may be of interest to know how a voltage at one or more points separated by large distances varies in response to an event occurring at another point. In that case, it may be useful for one or more of the nodes to be sensors.

The ability to cause power converters to cooperate with each other in the manner described herein enables smaller power converters to be combined to form bigger converters. For example, wind turbines often use power converters to convert the variable amplitude and frequency of the output of a wind turbine into the constant amplitude and frequency required by the power grid. If a wind turbine has a higher output than any available converter, it can still be used to generate power by combining multiple converters as described herein. Similarly, solar farms use power converters to converter variable dc from an array of solar electric panels to the constant amplitude and frequency required by the power grid. If a solar farm has a high output than any available converter, it can still be used to generate power by combining multiple converters as described herein.

The availability of a converter synchronizing method and system thus enables power converters of various sizes to be built up from existing power converters. Such modular construction of customized power converters provides greater flexibility for the consumer, who now has more power ratings to choose from, and greater efficiency for the manufacturer, who would not have to manufacture a separate power converter for each power rating sought by the consumer.

It is to be understood that the foregoing description is intended to illustrate and not to limit the scope of the inven- Having described the invention, and a preferred embodiment thereof, what we claim as new, and secured by Letters Patent is:

1. A method for providing electric power to a power system, said method comprising:
receiving, at a slave node of a power converter having a plurality of slave nodes, a first synchronization signal via a first communication channel, said first synchronization signal purporting to represent of a master timing characteristic of a master control node of said power converter;
receiving, at said slave node of said power converter, a second synchronization signal via a second communication channel, said second synchronization signal purporting to represent a master timing characteristic of said master control node of said power converter;
synchronizing an internal timing characteristic of said slave control node with said master timing characteristic of said master control node using said first synchronization signal;
determining that said first synchronization signal is invalid; and
synchronizing an internal timing characteristic of said slave control node with said master timing characteristic of said master control node using said second synchronization signal.

2. The method of claim 1, wherein determining that said first synchronization signal is invalid comprises comparing a master timing characteristic represented by said first synchronization signal with a first timing characteristic of a first phase locked loop of said slave node.

3. The method of claim 1, further comprising: receiving, at said slave control node,
a first time-of-flight signal via said first communication channel, and
a second time-of-flight signal via said second communication channel.

4. The method of claim 3, wherein determining that said first synchronization is invalid comprises: comparing said master timing characteristic represented by said first synchronization signal with a first timing characteristic of a first phase locked loop of the slave control node, said first timing characteristic having been compensated said the first time-of-flight signal.

5. The method of claim 3, further comprising simultaneously enabling a circuit pathway for either the first synchronization signal and the first time-of-flight signal or the second synchronization signal and the second time-of-flight signal.

6. The method of claim 1, further comprising receiving a first data packet via said first communication channel and a second data packet via said second communication channel.

7. The method of claim 1, wherein
receiving said first synchronization signal includes receiving said first synchronization signal from a first adjacent slave control node, and
receiving said second synchronization signal includes receiving said second synchronization signal from a second adjacent slave control node.

8. The method of claim 7, further comprising:
sending said first synchronization signal via said first communication channel to said second adjacent slave control node, and
sending said second synchronization signal via said second communication channel to said first adjacent control node.

9. The method of claim 1, wherein the power system comprises an electric power grid.

10. The method of claim 1, wherein the power system comprises an electric machine.

11. The method of claim 10, wherein the electric machine comprises a wind turbine.

12. The method of claim 1, further comprising selecting a time interval between synchronizing an internal timing characteristic of said slave control node with said master timing characteristic of said master control node using said first synchronization signal and synchronizing an internal timing characteristic of said slave control node with said master timing characteristic of said master control node using said second synchronization signal such that an extent of deviation of said internal timing characteristic remains below a selected threshold.

13. An apparatus for controlling an electric power converter having a plurality of nodes, of which one node is a master control node, said apparatus comprising:
first evaluation circuitry connected to a first communication channel between two nodes in said power converter, said first evaluation circuitry being configured to evaluate validity of a first synchronization signal received via said first communication channel, said first synchronization signal purporting to represent a master timing characteristic of said master control node of said power converter;
second evaluation circuitry connected to a second communication channel between said two nodes in said power converter, said second evaluation circuitry being configured to evaluate validity of a second synchronization signal received via said second communication channel, said second synchronization signal purporting to represent said master timing characteristic of said master control node of said power converter;
selection circuitry in communication with said first evaluation circuitry and with said second evaluation circuitry, said selection circuitry being configured to define, based at least in part on an output of said first evaluation circuitry and an output of said second evaluation circuitry, a selected communication channel from a group consisting of said first communication channel and said second communication channel; and
a timing module configured to synchronize an internal timing characteristic of said control node with said master timing characteristic, wherein said master timing characteristic is deemed to be represented by a synchronization signal carried by said selected communication channel.

14. The apparatus of claim 13,
wherein said first evaluation circuitry comprises first time-of-flight circuitry configured to evaluate validity of a first time-of-flight signal received via said first communication channel, and
wherein said second evaluation circuitry comprises second time-of-flight circuitry configured to evaluate validity of a second time-of-flight signal received via said second communication channel.

15. The apparatus of claim 14, wherein said first evaluation circuitry is configured to determine whether a value of said first time-of-flight signal is within a predetermined range.

16. The apparatus of claim 13,
wherein said first evaluation circuitry comprises first phase locked loop circuitry having a first timing characteristic locked to a master timing characteristic purportedly represented by a first synchronization signal, and wherein said second evaluation circuitry comprises second phase locked loop circuitry having a second timing characteristic locked to a master timing characteristic purportedly represented by said second synchronization signal.

17. The apparatus of claim 16, wherein said first and second phase locked loops have bandwidth frequencies selected such that an extent of a disturbance caused by switching between said first and second communication channels is below a pre-defined threshold.

18. The apparatus of claim 13, wherein said selection circuitry comprises a switch configured to switch between a first connection and a second connection,
   said first connection being a connection between said timing module and said first synchronization signal, and
   said second connection being a connection between said timing module and said second synchronization signal,
   wherein said first synchronization signal is received from a first adjacent control node and said second synchronization signal is received from a second adjacent control node.

19. The apparatus of claim 13, further comprising
   first output circuitry configured to send said first synchronization signal via said first communication channel to an second adjacent control node; and
   second output circuitry configured to send said second synchronization signal via said second communication channel to the first adjacent control node.

20. An apparatus for providing an output voltage waveform to a power grid, said apparatus comprising:
   a plurality of power converters, each of which includes a plurality of switching devices, each of which is configured to generate a voltage waveform to be combined with other voltage waveforms to generate said output voltage waveform to be provided to said power grid;
   a plurality of control nodes, each of which is associated one of said corresponding plurality of power converters, each of said control nodes being configured to control operation of said one of said corresponding plurality of power converters;
   a first ring network for providing communication between said control nodes in a first direction;
   a second ring network for providing communication between said control nodes in a second direction opposite to said first direction;
   wherein each of said control nodes comprises means for ignoring data provided on one of said first and second ring networks at least in part on the basis of a determination of validity of said data provided on said first and second ring networks.

* * * * *